United States Patent
Latussek et al.

[11] 3,749,457
[45] July 31, 1973

[54] GUIDE BEARING FOR USE IN THE HOUSING OR BEARING PLATE OF A MACHINE OR OTHER APPARATUS

[75] Inventors: Hans Peter Latussek, Feucht; Heinz Petrak, Nurnberg, both of Germany

[73] Assignee: Siemens Aktiengesellschaft, Berlin and Munich, Germany

[22] Filed: Dec. 8, 1971

[21] Appl. No.: 205,841

[30] Foreign Application Priority Data
Dec. 19, 1970 Germany .................. G 70 46 956.6

[52] U.S. Cl. .................................................. 308/58
[51] Int. Cl. ............................................ F16c 35/08
[58] Field of Search ..................... 58/140 R; 308/58, 308/59

[56] References Cited
FOREIGN PATENTS OR APPLICATIONS
1,579,777 10/1969 France .............................. 58/140 R Primary Examiner—Charles J. Myhre
Assistant Examiner—Frank Susko
Attorney—Arthur E. Wilfond, Herbert L. Lerner et al.

[57] ABSTRACT

A guide bearing disposed in the housing, bearing bracket or like structure of a machine or other apparatus having a shaft includes a guide bearing plate mounted on the structure for supporting the shaft of the apparatus. An elastic intermediate member having an outer peripheral surface is disposed intermediate the bearing plate and the structure. The intermediate member is made of porous material and is sealed at its outer periphery. The bearing plate has a portion supported on the intermediate member and this portion is formed with capillary bores extending therethrough and communicating with the member.

3 Claims, 2 Drawing Figures

PATENTED JUL 31 1973 3,749,457

GUIDE BEARING FOR USE IN THE HOUSING OR BEARING PLATE OF A MACHINE OR OTHER APPARATUS

The invention relates to a guide bearing disposed in the housing or bearing bracket of a machine or other apparatus. The guide bearing has a guide bearing plate which supports the shaft of the apparatus. The bearing plate is held to the structure over an elastic intermediate member.

Such a guide bearing is known through the Deutsche Gebrauchsmuster Nr. 7,012,805. In this guide bearing, the elastic intermediate member serves to attenuate axial vibrations of the shaft and to thereby minimize the noise caused by this vibration. Such a guide bearing must be provided with its own ancillary chamber for containing a lubrication medium for permanently lubricating the bearing, so that the lubrication medium will always reach the bearing location. Should oil be used as the lubrication medium, then the guide bearing must be correspondingly sealed so that the oil does not leave the bearing chamber. However, if grease is used as a lubrication medium and is placed into an ancillary chamber surrounding the bearing location, there exists the danger that the grease will be thrown away by centrifugal force and, consequently, the bearing location will not receive adequate lubrication.

Accordingly, it is an object of the invention to provide a guide bearing of the above mentioned type, wherein an adequate quantity of lubrication medium is continuously supplied to the bearing location. Subsidiary to this object, it is an object of the invention to supply the lubrication medium in the manner described without the need of a separate ancillary chamber for holding the medium.

According to a feature of the invention, an elastic intermediate member made of porous material is sealed at its outer periphery and a guide bearing plate has a portion supported on the intermediate member; this portion is formed with capillary bores extending therethrough and communicating with the elastic member. The outer periphery of the elastic member can, for example, be sealed to a structure of the machine or apparatus wherein it is used.

An especially even supply of the lubricating medium is obtained according to another feature of the invention, wherein the capillary bores are joined with each other by a capillary rill formed in the side of the guide bearing plate facing the shaft. The porous material of the elastic intermediate member is sealed at its outer periphery in a simple manner if this member is inserted in a cup-shaped end of a set screw engageable with the structure of the machine or other apparatus.

Although the invention is illustrated and described herein as a guide bearing for use in the housing or bearing plate of a machine or other apparatus, it is nevertheless not intended to be limited to the details shown, since various modifications may be made therein within the scope and the range of the claims. The invention, however, together with additional objects and advantages, will be best understood from the following description and in connection with the accompanying drawings in which:

Figure 1:
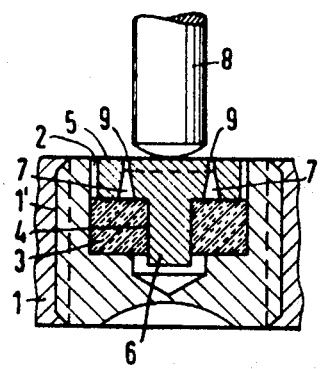
FIG. 1 is a sectional view of the guide bearing according to the invention.
Figure 2:
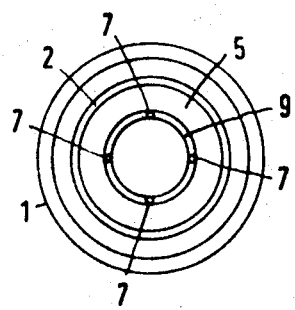
FIG. 2 is a plan view of the guide bearing illustrated in FIG. 1.

Referring to the guide bearing illustrated in FIGS. 1 and 2, an elastic intermediate member 3 is inserted into the cup-shaped end 2 of a set screw 1, threadably engaging a structure 1 of a machine or other apparatus having a shaft 8. The intermediate member 3 has an annular configuration and is made of porous material. A guide bearing plate 5 is inserted with its axial portion 6 into a ring opening 4 of the elastic intermediate member 3. The bearing plate 5 has a portion supported on the intermediate member 3. This portion also has capillary bores 7 formed therein and extending therethrough which are joined with each other by a capillary rill 9 formed in the face of the guide bearing plate 5 facing the shaft 8. The intermediate member 3, for example, can be made of rubber or plastic.

The elastic intermediate member 3, made of porous material, is permeated with oil that, during operation, reaches the bearing location of the shaft 8 on the top face of the guide bearing plate 5 through the capillary bores 7 and the rill 9; this assures an adequate lubrication of the supporting location. Thus, no separate ancillary chamber is required for the lubrication medium in the guide bearing according to the invention. Therefore, no sealing problems occur and an adequate lubrication of the bearing location is guaranteed since the lubrication medium creeps from the capillary bores and capillary rill over the guide bearing plate to the bearing location by means of the pump action occasioned by the vibration. This action produces pressure which forces the lubrication medium through the capillary bores to the top side of the guide bearing plate.

It is claimed:

1. A guide bearing disposed in the housing, bearing bracket or like structure of a machine or other apparatus having a shaft, comprising a guide bearing plate mounted on a structure for supporting the shaft, and an elastic intermediate member disposed intermediate said bearing plate and the structure and having an outer peripheral surface, said member being made of porous material and being sealed at said outer peripheral surface thereof, said bearing plate having a portion supported on said member, said portion being formed with capillary bores extending therethrough and communicating with said member.

2. The guide bearing of claim 1, said bearing plate having a surface for supporting the shaft, and said bearing plate having a capillary rill formed in said surface and joining said capillary bores with each other.

3. The guide bearing of claim 1, further comprising a set screw engageable with the structure, said set screw having a cup-shaped end for accommodating said intermediate member.

* * * * *